United States Patent
Jia et al.

(10) Patent No.: US 11,176,485 B2
(45) Date of Patent: Nov. 16, 2021

(54) DYNAMIC INTEGRATION OF MACHINE-LEARNING MODULES

(71) Applicant: Facebook, Inc., Menlo Park, CA (US)

(72) Inventors: Yangqing Jia, Sunnyvale, CA (US); Hsiu-Tung Alex Yu, Los Altos, CA (US); Joel Curtis McCall, Redmond, WA (US); Frank James Eisenhart, III, Seattle, WA (US); Andrew M. Rogers, Bellevue, WA (US)

(73) Assignee: Facebook Inc., Menlo Park, CA (US)

( * ) Notice: Subject to any disclaimer, the term of this patent is extended or adjusted under 35 U.S.C. 154(b) by 1084 days.

(21) Appl. No.: 15/696,419

(22) Filed: Sep. 6, 2017

(65) Prior Publication Data
US 2019/0073607 A1    Mar. 7, 2019

(51) Int. Cl.
*G06N 20/00* (2019.01)
*H04W 4/21* (2018.01)
*H04L 29/06* (2006.01)
*H04W 4/50* (2018.01)
*H04W 4/60* (2018.01)
*H04W 4/80* (2018.01)

(52) U.S. Cl.
CPC .............. *G06N 20/00* (2019.01); *H04W 4/21* (2018.02); *H04L 67/42* (2013.01); *H04W 4/50* (2018.02); *H04W 4/60* (2018.02); *H04W 4/80* (2018.02)

(58) Field of Classification Search
CPC ........ G06N 20/00; G06N 20/20; H04L 67/42; H04W 4/21; H04W 4/50; H04W 4/60; H04W 4/80
See application file for complete search history.

(56) References Cited

U.S. PATENT DOCUMENTS

2017/0243132 A1 *   8/2017   Sainani ................. G06N 5/025
2018/0336415 A1 * 11/2018   Anorga ............. G06K 9/00671

* cited by examiner

*Primary Examiner* — Alan Chen
*Assistant Examiner* — Brent Johnston Hoover
(74) *Attorney, Agent, or Firm* — Baker Botts L.L.P.

(57) ABSTRACT

In one embodiment, a method includes a system building a first machine-learning module and one or more secondary machine-learning modules for operating with an application. The first and second modules may be configured to utilize, in operation, particular types of processing hardware, respectively. The system may receive from a client device a request to download the application, and in response send to the device the application with the first module. The system may then receive another request to download a selected one of the secondary modules, which may be selected based on a determination by the application running on the device that the associated type of processing hardware is available. In response, the system may send the selected module to the device. The application may be configured to selectively use the first module or the selected module to perform an operation.

20 Claims, 3 Drawing Sheets

DYNAMIC INTEGRATION OF MACHINE-LEARNING MODULES

TECHNICAL FIELD

This disclosure generally relates to software applications and their integration with modules of different machine-learning models.

BACKGROUND

Software applications, or apps, can be readily distributed over networks such as the Internet. Mobile devices in particular are often built on app-distribution platforms through which users may search for and download apps directly onto their devices. Several factors apply pressure on app developers to limit the file size of apps. An app-distribution platform, for example, may restrict app sizes to be within a maximum limit. The app-distribution platform may also restrict the type of network that may be used to download apps that are above a threshold size (e.g., large files may only be downloaded via Wi-Fi and not cellular connection). From the users' perspective, large apps are undesirable because download time is directly related to file size. Further, certain users who have limited cellular data plans (e.g., 5 gigabytes per month) may be weary of downloading large apps through their cellular network, because doing so may deplete their data allowance. As yet another example, mobile phones have relatively small storage space (especially compared to desktops and laptops), which means mobile phone users often have to be mindful of storage usage. These interests for reducing app sizes, however, conflict with the app developer's and the users' interest in having feature-rich, better performing, and more robust applications.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Embodiments described herein relates to a framework for modularizing machine-learning models of mobile applications and configuring those models to be downloaded as needed. Machine-learning models are increasingly being used by mobile applications and run on client devices. Machine-learning models, however, often need to perform computationally intensive operations, which may strain the processing capabilities of client devices and lead to suboptimal performances that may be undesirable/unacceptable to end users. To improve performance, certain machine-learning models may be designed to not only run on general-purpose central processing units ("CPU"), but also utilize other device resources such as graphics processing units ("GPU") with vendor-provided libraries or custom libraries, ARM processor, or other system-on-chips ("SOC"). Since different client devices may have different hardware resources, a mobile application wishing to leverage those resources across different platforms may need to package its application with several different implementations of its machine-learning model. The result may be an excessively large application. This may pose a problem for mobile applications, since a client device's storage and network bandwidth may be limited and ecosystems such as Android and iOS may place size restrictions on applications.

Particular embodiments described herein address the competing interests of having a better-performing machine-learning process and reducing an application's file size. In particular embodiments, different machine-learning models may be configured to be trained or operate using different types of processing hardware, such as CPU, GPU, etc. Rather than designing an app that is pre-integrated with all the different models—which may have the undesired consequence of enlarging the app size—the app may be configured to integrate with any modularized machine-learning model at run time. For example, by default, an app may be designed to utilize a CPU-based machine-learning model. The app may be downloaded by a client device with the CPU-based machine-learning model. Other types of machine-learning models optimized to leverage other types of hardware may not be part of the initial download. Instead, at run time, the app may determine what hardware resources are present on the particular client device and request to download the corresponding machine-learning model. This framework achieves the desired goal of having an app designed to most effectively use the resources available to it (e.g., processing hardware) across different devices, while maintaining a relatively small file-size footprint.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
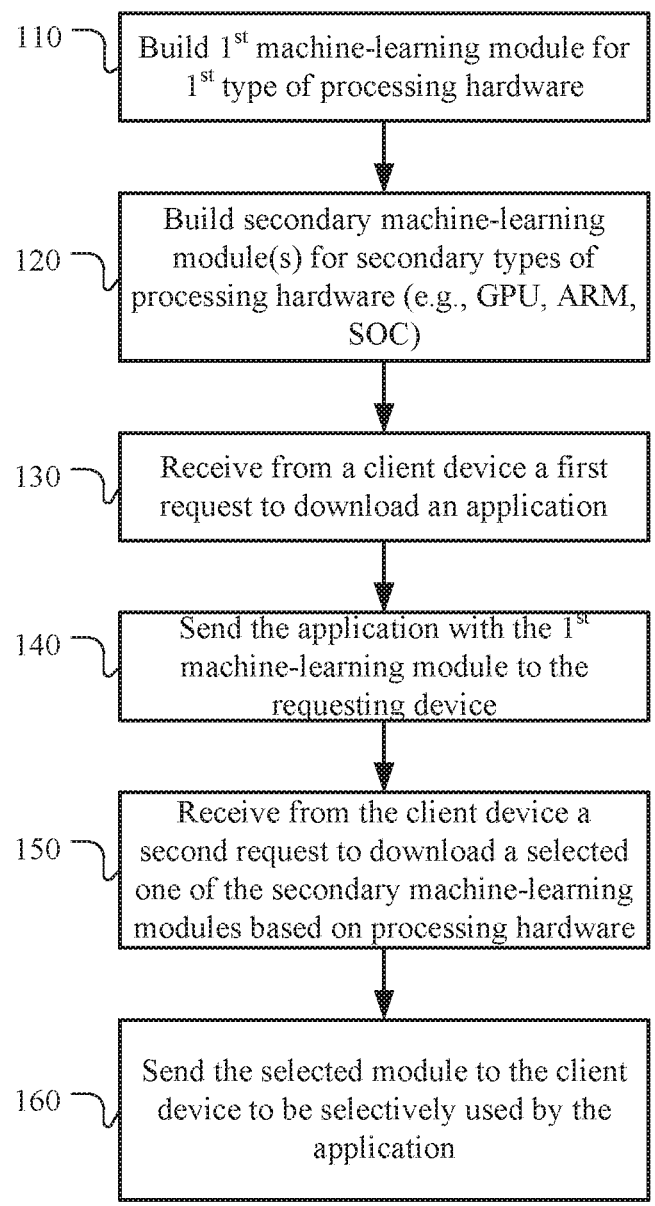
FIG. 1 illustrates an example method for dynamically integrating an application with a machine-learning module.

Particular embodiments described herein allow the file size of software applications to be reduced without sacrificing their ability to leverage different available hardware resources to run machine-learning models. At a high-level, a machine-learning model's definition may be separated from its implementation. For instance, a machine-learning model designed for performing an operation (e.g., including machine-learning training and/or post-training operations) may be modularized so that the model may comprise a primary CPU-based executable, which may be configured to perform the entire operation of the model, and optional modularized executables that may be tailored for different system resources, such as processing hardware like GPU and SOCs. For example, if the operation of one portion of a machine-learning model is suitable for parallel processing, that portion may be separately implemented by several modularized executables for corresponding SOCs. When the application is downloaded onto a client device, the CPU-based executable may be downloaded without any of the resource-specific executables (including, e.g., GPU-based and SOC-based executables). In doing so, the default application size may be kept to a minimum while remaining fully functional. At run time, the application may query the client device's hardware capabilities and use it to identify a suitable resource-specific executable that may improve the machine-learning model's performance. Different device may thus only download resource-specific executables that are compatible with its system resources and avoid downloading/storing non-compatible ones unnecessarily.

In particular embodiments, at build time, the machine-learning model used by an application may be represented using an operation graph whose nodes represent particular components or operations. The granularity of what a node represents may be predefined. For example, nodes may represent an arithmetic or logical operation, a collection of operations performed on a dataset, a computational iteration, a database query or joinder, or any other operational portion of the model. A directional edge between two nodes may represent a dependency between the corresponding components/operations. For example, if an edge connects node A to node B, it may represent a sequence of operation, where node A's operation is to be performed before node B's operation. This may be because node B's operation takes as input the output of node A's operation. Nodes may also be connected in a many-to-one (n:1), one-to-many (1:n), or many-to-many (n:m) configuration. In particular embodiments, a model designer or build engineer may label any of the nodes or collection of nodes as modular candidates.

In particular embodiments, at build time, the build machine may examine the graph and generate a CPU-based executable implementing all the operations in the graph, and separate resource-specific modules based on the labeled module candidates. For example, the build machine may traverse the graph and logically identify a labeled node(s) and all of its children that are exclusively used under that node. In particular embodiments, if a child node is shared with others (e.g., it may also be a child of a primary operational node that does not belong to a module), then that child node may be packaged with the primary application and not with the modular component. For each collection of nodes that have been determined to be part of a module, the build machine may then build different resource-specific versions of the module. Conceptually, given the same or substantially the same input to the resource-specific modules, the same or substantially the same output can be expected. Each of the resource-specific modules, however, may perform the operations differently based on different hardware resources. For instance, a GPU-specific module may utilize certain multithreading capabilities offered by the particular type of GPU and use the libraries offered by the GPU's manufacturer. A SOC-specific module may also take advantage of whatever resources offered by the particular SOC. Any of these resource-specific modules may be used by the primary CPU-based executable to perform the operations corresponding to the module definition in lieu of its own CPU-based implementation.

In particular embodiments, to support integration with the modularized components, the main application, which includes the CPU-based executable, may be configured to operate with the optional modules through foreign function interfaces (FFI). The FFI may declare that it is possible for certain operations to be performed by predefined modules or libraries. For example, the main application or the CPU-based executable for the machine-learning module may, based on FFI definition, know that a particular operation may optionally be performed by certain resource-specific modules if the corresponding resource is available on the device where the application is installed. The FFI may define, for example, the types of optional resource-specific modules available and their corresponding device-resource requirements, the server through which such resource-specific modules may be downloaded, and the available methods/functions of the modules. In particular embodiments, the FFI may serve as an interface between the main application's programming/scripting language and low-level resource-specific language used by the modules. For example, an FFI may define functions that map to functions of resource-specific libraries.

At run time, if the application determines that the client device on which it is running has a supported hardware resource, the application may attempt to communicate with a server and request the appropriate resource-specific module or update a previously downloaded resource-specific module. In particular embodiments, when the application first runs on the client device, it may query the device for system information. The system information may explicitly indicate whether it has the types of resources of interest (e.g., particular type of GPU, SOC, etc.), or such information may be inferred. For example, the device model (e.g., a particular mobile phone model) may be used to determine what resources it has based on a known knowledge store. In particular embodiments, the application may itself make a determination of which resource-specific module to download based on the system information available, or it may send the system information to a server and let the server make the determination. In certain embodiments, the server may be a central controller that would then provide the URI of another server from which the module may be directly downloaded. In other embodiments, the application may be configured with such URI information. Through the URI, the application may attempt to download the resource-specific module, and/or any additional modules or resource-specific libraries on which the requested module depends (the dependency relationship may be stored in graphical form accessible to the download server).

When running the machine-learning model, the CPU-based model, in particular embodiments, may check whether any of the suitable resource-specific modules has been downloaded. If not, the CPU-based model may continue the operation using the CPU. But if a resource-specific module has been downloaded, the CPU-based model may instead use that module to perform the modularized operation using the definitions provided by the FFI. In particular embodiments, the modularized operation may be invoked via the FFI without regard to which resource-specific module is to be used. In other words, from the perspective of the invoking component (e.g., the application itself), the specific module used may be abstracted out and is a black box. The FFI would make the determination of which module is ready to be used (e.g., whether the module and required libraries have been downloaded) based on system capabilities.

In particular embodiments, the application may discretionarily invoke or configure the resource-specific module based on run-time characteristics. For example, if battery is low or if battery consumption is a priority (e.g., the device may be operating in power-saving mode), the application may choose not to use the module even though it is available or throttle down its performance. In particular embodiments, the application may opt to use the CPU or a combination of the CPU and the hardware resource to perform the desired operation, and cause the appropriate modules to be invoked. In particular embodiments, a CPU-based module and a resource-specific module may operate in parallel to perform different operations or the same operation on different sets of data.

In particular embodiments, the downloaded machine-learning modules, if applicable, may also be shared between different applications, thereby further reducing the total storage space required. If a module becomes obsolete, it may be removed or simply not used, as the CPU-based model is still fully functional. The modularity of the resource-specific modules affords the application to effectively manage its storage footprint while maximizing its performance and efficiency across different platforms.

FIG. 1 illustrates an example method 100 for dynamically integrating an application with a machine-learning module. The method may begin at step 110, where a computing system (e.g., one or more associated computing devices, including a build machine for compiling code for building executables, data centers, network servers, etc.) may build a first machine-learning module for operating with an application, the first machine-learning module being configured to utilize, in operation, a first type of processing hardware (e.g., CPU). The first machine-learning module may, for example, be built based on an operational graph for performing training operations according to a machine-learning model. At step 120, the computing system may build one or more secondary machine-learning modules (e.g., resource-specific modules) for operating with the application, the one or more secondary machine-learning modules being configure to utilize, in operation, one or more secondary types of processing hardware (e.g., GPU, SOC, ARM processor), respectively. The one or more secondary types of processing hardware may be different from each other and different from the first type of processing hardware. At step 130, the computing system may receive from a first client device a first request to download the application. At step 140, the computing system may send the application with the first machine-learning module to the first client device in response to the first request. At step 150, the computing system may receive from the first client device a second request to download a selected one of the one or more secondary machine-learning modules. The selected secondary machine-learning module may be selected based on a determination by the application running on the first client device that the secondary type of processing hardware associated with the selected secondary machine-learning module is available on the first client device. At step 160, the computing system may send the selected secondary machine-learning module to the first client device in response to the second request. The application may be configured to selectively use the first machine-learning module or the selected secondary machine-learning module to perform an operation. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for dynamically integrating an application with a machine-learning module, including the particular steps of the method of FIG. 1, this disclosure contemplates any suitable method for dynamically integrating an application with a machine-learning module, including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 2:
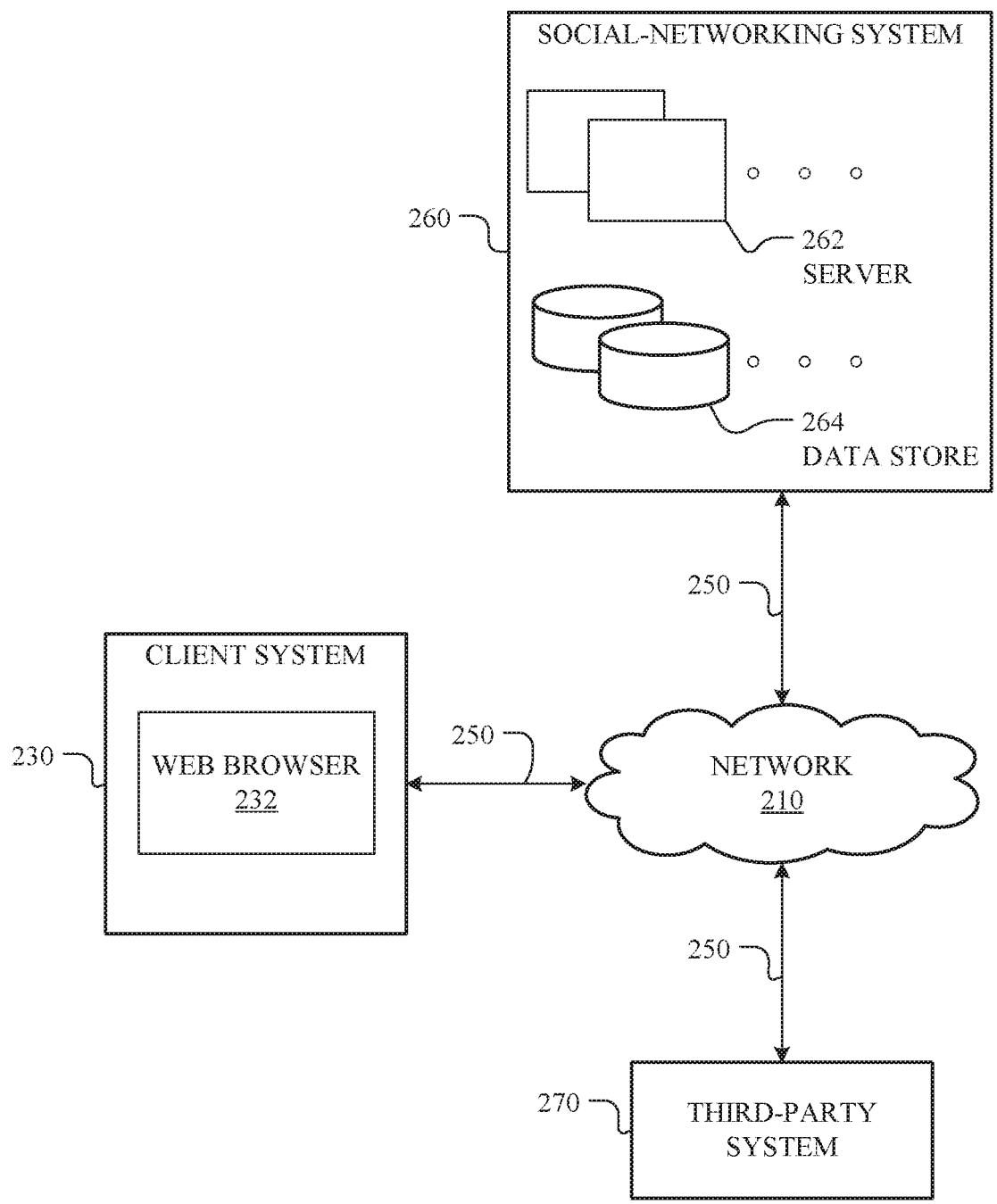
FIG. 2 illustrates an example network environment associated with a social-networking system.

FIG. 2 illustrates an example network environment 200 associated with a social-networking system. Network environment 200 includes a client system 230, a social-networking system 260, and a third-party system 270 connected to each other by a network 210. Although FIG. 2 illustrates a particular arrangement of client system 230, social-networking system 260, third-party system 270, and network 210, this disclosure contemplates any suitable arrangement of client system 230, social-networking system 260, third-party system 270, and network 210. As an example and not by way of limitation, two or more of client system 230, social-networking system 260, and third-party system 270 may be connected to each other directly, bypassing network 210. As another example, two or more of client system 230, social-networking system 260, and third-party system 270 may be physically or logically co-located with each other in whole or in part. Moreover, although FIG. 2 illustrates a particular number of client systems 230, social-networking systems 260, third-party systems 270, and networks 210, this disclosure contemplates any suitable number of client systems 230, social-networking systems 260, third-party systems 270, and networks 210. As an example and not by way of limitation, network environment 200 may include multiple client system 230, social-networking systems 260, third-party systems 270, and networks 210.

This disclosure contemplates any suitable network 210. As an example and not by way of limitation, one or more portions of network 210 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 210 may include one or more networks 210.

Links 250 may connect client system 230, social-networking system 260, and third-party system 270 to communication network 210 or to each other. This disclosure contemplates any suitable links 250. In particular embodiments, one or more links 250 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 250 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 250, or a combination of two or more such links 250. Links 250 need not necessarily be the same throughout network environment 200. One or more first links 250 may differ in one or more respects from one or more second links 250.

In particular embodiments, client system 230 may be an electronic device including hardware, software, or embedded logic components or a combination of two or more such components and capable of carrying out the appropriate functionalities implemented or supported by client system 230. As an example and not by way of limitation, a client system 230 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 230. A client system 230 may enable a network user at client system 230 to access network 210. A client system 230 may enable its user to communicate with other users at other client systems 230.

In particular embodiments, client system 230 may include a web browser 232, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 230 may enter a Uniform Resource Locator (URL) or other address directing the web browser 232 to a particular server (such as server 262, or a server associated with a third-party system 270), and the web browser 232 may generate a Hyper Text Transfer Protocol (HTTP) request and communicate the HTTP request to server. The server may accept the HTTP request and communicate to client system 230 one or more Hyper Text Markup Language (HTML) files responsive to the HTTP request. Client system 230 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 260 may be a network-addressable computing system that can host an online social network. Social-networking system 260 may generate, store, receive, and send social-networking data, such as, for example, user-profile data, concept-profile data, social-graph information, or other suitable data related to the online social network. Social-networking system 260 may be accessed by the other components of network environment 200 either directly or via network 210. As an example and not by way of limitation, client system 230 may access social-networking system 260 using a web browser 232, or a native application associated with social-networking system 260 (e.g., a mobile social-networking application, a messaging application, another suitable application, or any combination thereof) either directly or via network 210. In particular embodiments, social-networking system 260 may include one or more servers 262. Each server 262 may be a unitary server or a distributed server spanning multiple computers or multiple datacenters. Servers 262 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 262 may include hardware, software, or embedded logic components or a combination of two or more such components for carrying out the appropriate functionalities implemented or supported by server 262. In particular embodiments, social-networking system 260 may include one or more data stores 264. Data stores 264 may be used to store various types of information. In particular embodiments, the information stored in data stores 264 may be organized according to specific data structures. In particular embodiments, each data store 264 may be a relational, columnar, correlation, or other suitable database. Although this disclosure describes or illustrates particular types of databases, this disclosure contemplates any suitable types of databases. Particular embodiments may provide interfaces that enable a client system 230, a social-networking system 260, or a third-party system 270 to manage, retrieve, modify, add, or delete, the information stored in data store 264.

In particular embodiments, social-networking system 260 may store one or more social graphs in one or more data stores 264. In particular embodiments, a social graph may include multiple nodes—which may include multiple user nodes (each corresponding to a particular user) or multiple concept nodes (each corresponding to a particular concept)—and multiple edges connecting the nodes. Social-networking system 260 may provide users of the online social network the ability to communicate and interact with other users. In particular embodiments, users may join the online social network via social-networking system 260 and then add connections (e.g., relationships) to a number of other users of social-networking system 260 to whom they want to be connected. Herein, the term "friend" may refer to any other user of social-networking system 260 with whom a user has formed a connection, association, or relationship via social-networking system 260.

In particular embodiments, social-networking system 260 may provide users with the ability to take actions on various types of items or objects, supported by social-networking system 260. As an example and not by way of limitation, the items and objects may include groups or social networks to which users of social-networking system 260 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 260 or by an external system of third-party system 270, which is separate from social-networking system 260 and coupled to social-networking system 260 via a network 210.

In particular embodiments, social-networking system 260 may be capable of linking a variety of entities. As an example and not by way of limitation, social-networking system 260 may enable users to interact with each other as well as receive content from third-party systems 270 or other entities, or to allow users to interact with these entities through an application programming interfaces (API) or other communication channels.

In particular embodiments, a third-party system 270 may include one or more types of servers, one or more data stores, one or more interfaces, including but not limited to APIs, one or more web services, one or more content sources, one or more networks, or any other suitable components, e.g., that servers may communicate with. A third-party system 270 may be operated by a different entity from an entity operating social-networking system 260. In particular embodiments, however, social-networking system 260 and third-party systems 270 may operate in conjunction with each other to provide social-networking services to users of social-networking system 260 or third-party systems 270. In this sense, social-networking system 260 may provide a platform, or backbone, which other systems, such as third-party systems 270, may use to provide social-networking services and functionality to users across the Internet.

In particular embodiments, a third-party system 270 may include a third-party content object provider. A third-party content object provider may include one or more sources of content objects, which may be communicated to a client system 230. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 260 also includes user-generated content objects, which may enhance a user's interactions with social-networking system 260. User-generated content may include anything a user can add, upload, send, or "post" to social-networking system 260. As an example and not by way of limitation, a user communicates posts to social-networking system 260 from a client system 230. Posts may include data such as status updates or other textual data, location information, photos, videos, links, music or other similar data or media. Content may also be added to social-networking system 260 by a third-party through a "communication channel," such as a newsfeed or stream.

In particular embodiments, social-networking system 260 may include a variety of servers, sub-systems, programs, modules, logs, and data stores. In particular embodiments, social-networking system 260 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 260 may also include suitable components such as network interfaces, security mechanisms, load balancers, failover servers, management-and-network-operations consoles, other suitable components, or any suitable combination thereof. In particular embodiments, social-networking system 260 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 260 to one or more client systems 230 or one or more third-party system 270 via network 210. The web server may include a mail server or other messaging functionality for receiving and routing messages between social-networking system 260 and one or more client systems 230. An API-request server may allow a third-party system 270 to access information from social-networking system 260 by calling one or more APIs. An action logger may be used to receive communications from a web server about a user's actions on or off social-networking system 260. In conjunction with the action log, a third-party-content-object log may be maintained of user exposures to third-party-content objects. A notification controller may provide information regarding content objects to a client system 230. Information may be pushed to a client system 230 as notifications, or information may be pulled from client system 230 responsive to a request received from client system 230. Authorization servers may be used to enforce one or more privacy settings of the users of social-networking system 260. A privacy setting of a user determines how particular information associated with a user can be shared. The authorization server may allow users to opt in to or opt out of having their actions logged by social-networking system 260 or shared with other systems (e.g., third-party system 270), such as, for example, by setting appropriate privacy settings. Third-party-content-object stores may be used to store content objects received from third parties, such as a third-party system 270. Location stores may be used for storing location information received from client systems 230 associated with users. Advertisement-pricing modules may combine social information, the current time, location information, or other suitable information to provide relevant advertisements, in the form of notifications, to a user.

Figure 3:
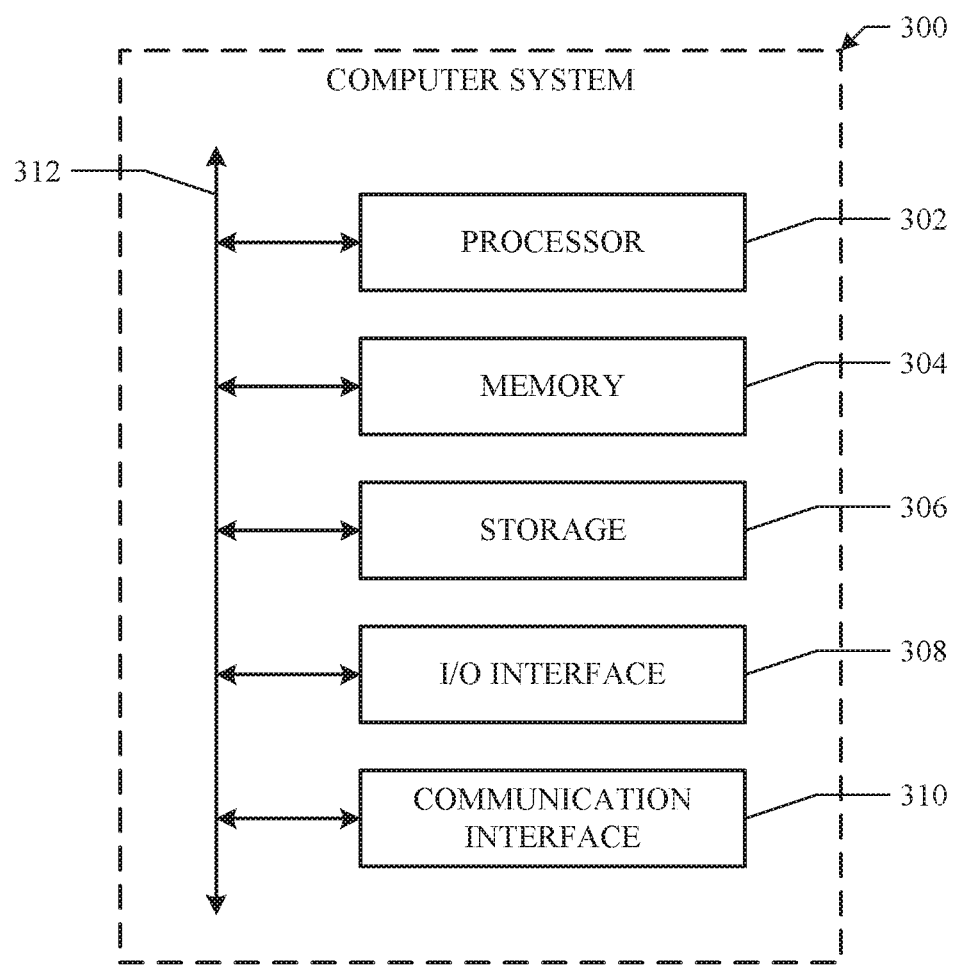
FIG. 3 illustrates an example computer system.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing system, building a first machine-learning module for operating with an application, the first machine-learning module being configured to utilize, in operation, a first type of processing hardware;
by the computing system, building one or more secondary machine-learning modules for operating with the application, the one or more secondary machine-learning modules being configured to utilize, in operation, one or more secondary types of processing hardware, respectively, wherein the one or more secondary types of processing hardware are different from each other and different from the first type of processing hardware;

by the computing system, receiving from a first client device a first request to download the application;

by the computing system, sending a portion of the application with the first machine-learning module to the first client device in response to the first request to download the application;

by the computing system, after sending the portion of the application with the first machine-learning module to the first client device, receiving from the first client device a second request to download a selected one of the one or more secondary machine-learning modules, wherein the second request from the first client device to download the selected secondary machine-learning module is made after a determination by the application with the first machine-learning module that the secondary type of processing hardware associated with the selected secondary machine-learning module is available on the first client device; and by the computing system, sending the selected secondary machine-learning module to the first client device in response to the second request;

wherein the application at run time is configured to integrate (1) the first machine-learning module that is first downloaded along with the application with (2) the selected secondary machine-learning module that is subsequently downloaded on the first client device after the determination by the application with the first machine-learning module that the secondary type of processing hardware associated with the selected secondary machine-learning module is available on the first client device, and wherein the application is configured to selectively use the first machine-learning module or the selected secondary machine-learning module to perform an operation.

2. The method of claim 1, further comprising:

by the computing system, receiving from a second client device a third request to download the application;

by the computing system, sending the application with the first machine-learning module to the second client device in response to the third request;

by the computing system, receiving from the second client device a fourth request to download a second selected one of the one or more secondary machine-learning modules, wherein the second selected secondary machine-learning module is different from the selected secondary machine-learning module requested by the first client device; and by the computing system, sending the second selected secondary machine-learning module to the second client device in response to the fourth request.

3. The method of claim 1, wherein the first type of processing hardware is a central processing unit, wherein the one or more secondary types of processing hardware comprises a graphical processing unit or an ARM processor.

4. The method of claim 1, wherein the application is configured to use the first machine-learning module and the selected secondary machine-learning module in parallel to perform different operations.

5. The method of claim 1, wherein the application sent to the first client device is configured to operate with each of the one or more secondary machine-learning modules.

6. The method of claim 1, wherein the application is configured to perform the operation using the first machine-learning module prior to receiving the selected secondary machine-learning module.

7. The method of claim 1, wherein the application is configured to throttle down, based on a determination that a battery level of the first client device is low, a performance of the secondary type of processing hardware associated with the selected secondary machine-learning module available on the first client device.

8. One or more computer-readable non-transitory storage media embodying software that is operable when executed to:

build a first machine-learning module for operating with an application, the first machine-learning module being configured to utilize, in operation, a first type of processing hardware;

build one or more secondary machine-learning modules for operating with the application, the one or more secondary machine-learning modules being configured to utilize, in operation, one or more secondary types of processing hardware, respectively, wherein the one or more secondary types of processing hardware are different from each other and different from the first type of processing hardware;

receive from a first client device a first request to download the application;

send a portion of the application with the first machine-learning module to the first client device in response to the first request to download the application;

after sending the portion of the application with the first machine-learning module to the first client device, receive from the first client device a second request to download a selected one of the one or more secondary machine-learning modules, wherein the second request from the first client device to download the selected secondary machine-learning module is made after a determination by the application with the first machine-learning module that the secondary type of processing hardware associated with the selected secondary machine-learning module is available on the first client device; and send the selected secondary machine-learning module to the first client device in response to the second request;

wherein the application at run time is configured to integrate (1) the first machine-learning module that is first downloaded along with the application with (2) the selected secondary machine-learning module that is subsequently downloaded on the first client device after the determination by the application with the first machine-learning module that the secondary type of processing hardware associated with the selected secondary machine-learning module is available on the first client device, and wherein the application is configured to selectively use the first machine-learning module or the selected secondary machine-learning module to perform an operation.

9. The media of claim 8, wherein the software is further operable when executed to:

receive from a second client device a third request to download the application;

send the application with the first machine-learning module to the second client device in response to the third request;

receive from the second client device a fourth request to download a second selected one of the one or more secondary machine-learning modules, wherein the second selected secondary machine-learning module is different from the selected secondary machine-learning module requested by the first client device; and send the second selected secondary machine-learning module to the second client device in response to the fourth request.

10. The media of claim 8, wherein the first type of processing hardware is a central processing unit, wherein the one or more secondary types of processing hardware comprises a graphical processing unit or an ARM processor.

11. The media of claim 8, wherein the application is configured to use the first machine-learning module and the selected secondary machine-learning module in parallel to perform different operations.

12. The media of claim 8, wherein the application sent to the first client device is configured to operate with each of the one or more secondary machine-learning modules.

13. The media of claim 8, wherein the application is configured to perform the operation using the first machine-learning module prior to receiving the selected secondary machine-learning module.

14. The media of claim 8, wherein the application is configured to throttle down, based on a determination that a battery level of the first client device is low, a performance of the secondary type of processing hardware associated with the selected secondary machine-learning module available on the first client device.

15. A system comprising:
one or more processors; and
one or more computer-readable non-transitory storage media coupled to one or more of the processors and comprising instructions operable when executed by one or more of the processors to cause the system to:
build a first machine-learning module for operating with an application, the first machine-learning module being configured to utilize, in operation, a first type of processing hardware;
build one or more secondary machine-learning modules for operating with the application, the one or more secondary machine-learning modules being configured to utilize, in operation, one or more secondary types of processing hardware, respectively, wherein the one or more secondary types of processing hardware are different from each other and different from the first type of processing hardware;
receive from a first client device a first request to download the application;
send a portion of the application with the first machine-learning module to the first client device in response to the first request to download the application;
after sending the portion of the application with the first machine-learning module to the first client device, receive from the first client device a second request to download a selected one of the one or more secondary machine-learning modules, wherein the second request from the first client device to download the selected secondary machine-learning module is made after a determination by the application with the first machine-learning module that the secondary type of processing hardware associated with the selected secondary machine-learning module is available on the first client device; and send the selected secondary machine-learning module to the first client device in response to the second request;

wherein the application at run time is configured to integrate (1) the first machine-learning module that is first downloaded along with the application with (2) the selected secondary machine-learning module that is subsequently downloaded on the first client device after the determination by the application with the first machine-learning module that the secondary type of processing hardware associated with the selected secondary machine-learning module is available on the first client device, and wherein the application is configured to selectively use the first machine-learning module or the selected secondary machine-learning module to perform an operation.

16. The system of claim 15, wherein the processors are further operable when executing the instructions to:
receive from a second client device a third request to download the application;
send the application with the first machine-learning module to the second client device in response to the third request;
receive from the second client device a fourth request to download a second selected one of the one or more secondary machine-learning modules, wherein the second selected secondary machine-learning module is different from the selected secondary machine-learning module requested by the first client device; and
send the second selected secondary machine-learning module to the second client device in response to the fourth request.

17. The system of claim 15, wherein the application is configured to use the first machine-learning module and the selected secondary machine-learning module in parallel to perform different operations.

18. The system of claim 15, wherein the application sent to the first client device is configured to operate with each of the one or more secondary machine-learning modules.

19. The system of claim 15, wherein the application is configured to perform the operation using the first machine-learning module prior to receiving the selected secondary machine-learning module.

20. The system of claim 15, wherein the application is configured to throttle down, based on a determination that a battery level of the first client device is low, a performance of the secondary type of processing hardware associated with the selected secondary machine-learning module available on the first client device.

* * * * *